US010344170B2

(12) United States Patent
Kostromine et al.

(10) Patent No.: US 10,344,170 B2
(45) Date of Patent: Jul. 9, 2019

(54) COATING AGENT AND FILMS HAVING INCREASED MECHANICAL AND CHEMICAL RESISTANCE AND SUFFICIENT DEFORMABILITY IN 2-D FILM INSERT MOLDING METHODS

(71) Applicant: Covestro Deutschland AG, Leverkusen (DE)

(72) Inventors: Serguei Kostromine, Swisttal-Buschhoven (DE); Joachim Petzoldt, Monheim (DE); Kay Lautwein, Köln (DE); Roland Künzel, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 297 days.

(21) Appl. No.: 15/129,203

(22) PCT Filed: Mar. 24, 2015

(86) PCT No.: PCT/EP2015/056212
§ 371 (c)(1),
(2) Date: Sep. 26, 2016

(87) PCT Pub. No.: WO2015/144680
PCT Pub. Date: Oct. 1, 2015

(65) Prior Publication Data
US 2018/0179392 A1 Jun. 28, 2018

(30) Foreign Application Priority Data

Mar. 27, 2014 (EP) .................................... 14161939

(51) Int. Cl.
C09D 4/06 (2006.01)
C09D 133/12 (2006.01)
B29C 45/14 (2006.01)
B29K 633/04 (2006.01)

(52) U.S. Cl.
CPC ............. C09D 4/06 (2013.01); C09D 133/12 (2013.01); B29C 45/14688 (2013.01); B29K 2633/08 (2013.01)

(58) Field of Classification Search
None
See application file for complete search history.

(56) References Cited

U.S. PATENT DOCUMENTS 4,185,009 A 1/1980 Idel et al.
4,310,600 A * 1/1982 Cross .................. C09D 183/04
427/171
5,235,026 A 8/1993 Wulff et al.
5,367,044 A 11/1994 Rosenquist
6,228,973 B1 5/2001 McCloskey et al.
6,613,869 B1 9/2003 Horn et al.
6,646,101 B2 11/2003 Kratschmer et al.
7,425,358 B2 9/2008 Heuer et al.
7,547,755 B2 6/2009 Heuer
2004/0183229 A1 9/2004 Kunzel et al.

FOREIGN PATENT DOCUMENTS

| DE | 1031512 B | 6/1958 |
|---|---|---|
| DE | 2500092 A1 | 7/1976 |
| DE | 4240313 A1 | 6/1994 |
| DE | 19943642 A1 | 3/2001 |
| EP | 0517044 A2 | 12/1992 |
| EP | 1506249 A1 | 2/2005 |
| EP | 1582549 A1 | 10/2005 |
| EP | 1884959 A1 | 2/2008 |
| WO | WO-027947 A1 | 1/2002 |
| WO | WO-0226862 A1 | 4/2002 |
| WO | WO-03095521 A1 | 11/2003 |
| WO | WO-2004082926 A2 | 9/2004 |
| WO | WO-2005113639 A1 | 12/2005 |
| WO | WO-2008037364 A1 | 4/2008 |

OTHER PUBLICATIONS

International Search Report for PCT/EP2015/056212 dated Sep. 18, 2015.

* cited by examiner

Primary Examiner — Sheeba Ahmed
(74) Attorney, Agent, or Firm — Drinker Biddle & Reath LLP

(57) ABSTRACT

A coating agent and films coated with it are provided, of which the coating comprises an enhanced mechanical and chemical resistance and a formability adequate for 2-D-film-insert molding processes. The coating agent, comprising
(a) at least one thermoplastic polymer with a proportion of at least 30% by weight of the solid content of the coating agent;
(b) at least one UV hardenable reactive thinner with a proportion of at least 30% by weight of the solid content of the coating agent;
(c) at least one photo-initiator; and
(d) at least one organic solvent,
wherein the proportion of ethylenically unsaturated groups amounts to at least 3 mol per kg of the solid content of the coating agent,
wherein the at least one reactive thinner comprises at least three polymerizable (meth)acrylate functions in the molecule and
wherein the ester-oxygen atoms of the (meth)acrylate functions in the molecule of the reactive thinner are separated from one another by a chain of at least six atoms.

15 Claims, No Drawings

COATING AGENT AND FILMS HAVING INCREASED MECHANICAL AND CHEMICAL RESISTANCE AND SUFFICIENT DEFORMABILITY IN 2-D FILM INSERT MOLDING METHODS

CROSS-REFERENCE TO RELATED APPLICATIONS

This application is a national stage application (under 35 U.S.C. § 371) of PCT/EP2015/056212, filed Mar. 24, 2015, which claims benefit of European Application No. 14161939.5, filed Mar. 27, 2014, both of which are incorporated herein by reference in their entirety.

The present invention relates to a coating agent which is particularly suitable for the coating of films and leads to a scratch-resistant and solvent-resistant surface, and to films coated with the coating agent. Because of the properties of the coated films in the 2-D film-insert molding process, the present invention relates to a manufacturing method for molded bodies and to molded bodies obtainable with the coating agent and the coated films.

BACKGROUND OF THE INVENTION

Synthetic-material molded bodies, which are simple to manufacture and of which the surface is protected from external influences, are required for a large number of applications. Film-insert molding technology has become established for the manufacture of such synthetic-material molded bodies in injection molding processes. It provides that the front surface of a molded body is initially preformed in two dimensions or three dimensions from a coated film and afterwards filled from behind or respectively back-injected with a synthetic-material melt.

Here, it is often desirable that the front side of the molded body is adequately protected from chemical and mechanical influences. This is often achieved in the prior art through a corresponding coating or lacquering of the surface. In order to avoid a wet coating of the finished parts, it is advantageous here that such a lacquering or coating is already applied to the film, which then runs through all further forming steps together with the film.

For such preformed films, there are two variants for further processing which place different requirements on the coating.

One variant is the so-called 3-D deformation. The film with the coating is strongly thermally deformed. It should be possible to deform the coating with the substrate strongly and into the smallest radii without cracks. It should be thermoplastic and, up to this moment, not yet cross-linked. After the deformation, the coating is finally hardened in a second technological step, through UV radiation and the cross-linking caused by it. In this manner, a front surface of a 3-D synthetic-material part of complex structure is provided, which is completely protected in all positions, even in strongly deformed positions. The film coatings which are suitable for this technology are referred to by the technical term "formable hardcoating", namely a film coating which is initially adequately block resistant, but which can then be arbitrarily thermally deformed together with the substrate and, at the end, receives the properties of a protective layer through UV hardening. Synthetic-material films coated with it are therefore thermally deformable and receive a scratch-resistant and particularly solvent-resistant surface through the downstream treatment with UV radiation. The desired synthetic-material molded bodies are obtained after the back-injection of these film products with polymer melts (film insert molding).

Such a combination—block resistance and thermoplastic behaviour of the primary coating together with the large latent potential for UV cross-linking—is difficult to realise and, after the deformation, require a UV hardening step of the deformed film part, in which it must be taken into consideration that the uniform irradiation of the film surfaces is made more difficult by the three-dimensional shape. The process of 3-D deformation is therefore sophisticated but demanding. It requires specially designed, coated substrates and above all special technological equipment for the steps of deformation and UV hardening.

Alongside the synthetic-material parts and molded bodies molded in a demanding manner as described, there are a large number of synthetic-material molded bodies which are constructed in a less complicated manner and are accessible via so-called 2-D deformation.

Accordingly, for a plurality of applications, synthetic-material molded parts are required, which comprise a slightly curved front surface with somewhat curved edges. Here, it is particularly desirable that the surface of these parts is protected from mechanical and chemical influences via a film fitted with a protective layer. The manufacture of such parts is conventionally implemented in an injection molding machine in one step. Accordingly, a flat (2-D) cut-to-size piece of a coated film is placed into an injection molding mold and pressed with a synthetic-material melt at high temperature against a prefabricated, formed mold-wall under high pressure. A slight deformation of the film therefore occurs simultaneously in one step with the back injection. The synthetic-material part should then be ready. Further treatment steps, such as a hardening step of the coating of the film are not provided or desirable in this case. This means that the protective function of the coating on the film should already be fully built up before its use in such 2-D film-insert molding processes.

A high scratch resistance and a high solvent resistance can generally be achieved only with a high cross-linking density within the coating of the film. Such layers are generally hard, rigid, brittle and cannot be deformed together with the substrate without cracking, even at increased temperatures. A good protective effect of the lacquer coating and its formability are therefore opposites.

A coating agent which, as a coating for a film, ensures good scratch resistance and solvent resistance, but which is then adequately thermally deformable together with the film in a film-insert molding process, especially in an FIM-2-D process, is desirable but difficult to realise

BRIEF SUMMARY OF THE INVENTION

A subject matter of the present invention is therefore a coating agent comprising
(a) at least one thermoplastic polymer with a proportion of at least 30% by weight of the solid content of the coating agent;
(b) at least one UV hardenable reactive thinner with a proportion of at least 30% by weight of the solid content of the coating agent;
(c) at least one photo-initiator; and
(d) at least one organic solvent,
wherein the proportion of ethylenically unsaturated groups amounts to at least 3 mol per kg of the solid content of the coating agent, wherein the at least one reactive thinner comprises at least three polymerisable (meth)acrylate functions in the molecule and
wherein the ester-oxygen atoms of the (meth)acrylate functions in the molecule of the reactive thinner are separated from one another by a chain of at least six atoms.

DETAILED DESCRIPTION OF THE INVENTION

The coating agent according to the invention can be readily applied to films with the measures known to the person skilled in the art and can therefore serve, in a particularly advantageous manner after drying and UV hardening, as a formable hardcoat. The coatings obtainable with the coating agent according to the invention can advantageously comprise a combination of block resistance, scratch resistance and solvent resistance and a thermal formability adequate at least for 2-D-FIM.

The reactive thinner, which has particular requirements to fulfil is of special importance for the properties of the coating agent according to the invention. In the case of its hardening, a large proportion of the soluble thermoplastic polymer should be included in such a manner that the resulting coating comprises a high solvent resistance. Here, the proportion of ethylenically unsaturated groups has a substantial influence on the attainable resistance properties of the radiation-hardened coating. Accordingly, the coating agent according to the invention has a content of at least 3 mol ethylenically unsaturated groups per kg solid content of the coating agent. This content is known to the person skilled in the art by the term double-bond density. Preferably, the coating agent according to the invention has a content of at least 3.5 mol, especially 4 mol, ethylenically unsaturated groups per kg solid content of the coating agent. For this purpose, the reactive thinner comprises at least three polymerisable (meth)acrylate functions in the molecule.

A further feature of the reactive thinner essential in combination with the double-bond density is the minimal length of the bond element between two polymerisable (meth)acrylate groups in the molecule of the reactive thinner. This is understood to mean the number of atoms which form an open chain of the bond member between two ester-oxygen atoms of the at least three (meth)acrylate functions in the molecule of the reactive thinner. According to the invention, the ester-oxygen atoms of the at least three (meth)acrylate functions are separated from one another by a chain of at least six atoms. Accordingly, a certain flexibility and the limited formability of the network present in the coating obtainable through the coating agent necessary for the 2-D deforming processes of the FIM process is achieved. If this chain between the ester-oxygen atoms of the acrylate functions in the reactive thinner molecule consists of only three atoms, as is the case, for example, in trimethylolpropane-triacrylate or dipentaeryhtrite-hexaacrylate, this leads to a particularly dense network in the coating obtainable through the coating agent. This dense network disadvantageously does not withstand a 2-D process in an FIM process without crack formation.

By preference, this chain separating the ester-oxygen atoms of the metal acrylate functions in the molecule of the reactive thinner contains at least 9 atoms. It is also preferable, if these atoms are selected from the group consisting of C-, N-, O-, S- and P-atoms and mixtures thereof.

Triacrylates of ethoxylated trimethylolpropane and tetraacrylates of ethoxylated pentaerythrite are advantageous in the sense of the invention. Ethoxylated (4) pentaerythrite-tetraacrylate (SR 494) and ethoxylated (9) trimethylolpropane-triacrylate (SR 502) are particularly advantageous. Ethoxylated (4) pentaerythrite-tetraacrylate (SR 494) is quite particularly preferred.

Thermoplastic polymers in the sense of the present invention are understood to be polymethylmethacrylate (PMMA), polyesters of various kinds (e.g. PET, PEN, PBTP and UP), other synthetic materials, such as hard-PVC, cellulose esters (such as CA, CAB, CP), polystyrene (PS) and copolymers (SAN, SB and MBS), polyacrylonitrile (PAN), ABS-synthetic materials, acrylonitrile methylmethacrylate (AMMA), acrylonitrile-styrene-acrylate (ASA), polyurethane (PUR), polyethylene (PE, PE-HD, -LD, -LLD, -C), polypropylene (PP), polyamide (PA), polycarbonate (PC) or polyethersulfone (PES) (abbreviations according to DIN 7728T1).

The Vicat softening temperatures VET (ISO 306) of the at least one thermoplastic polymer are preferably disposed in the region of at least 90° C., advantageously at least 95° C., particularly advantageously at least 100° C. In particular, linear thermoplastic polymers which fulfil the above conditions are preferred.

Polymethylmethacrylate is advantageously used as thermoplastic polymer and is therefore particularly preferred.

Polymethylmethacrylate (PMMA) is understood to mean polymethylmethacrylate homopolymers and copolymers based on methylmethacrylate with the methylmethacrylate proportion of more than 70% by weight, as they are known, for example, by the trade names Degalan®, Degacryl®, Plexyglas®, Acrylite® (manufactured by Evonik), Altuglas, Oroglas (manufactured by Arkema), Elvacite®. Colacryl®, Lucite® (manufactured by Lucite) and, inter alia, by the designations Acrylglas, Conacryl, Deglas, Diakon, Friacryl, Hesaglas, Limacryl, PerClax and Vitroflex.

PMMA homopolymers and copolymers made from 70% by weight to 99.5% by weight methylmethacrylate and 0.5% by weight to 30% by weight methylacrylate are preferred. PMMA homopolymers and copolymers made from 90% by weight to 99.5% by weight methylmethacrylate and 0.5% by weight to 10% by weight methylacrylate are particularly preferred. The Vicat softening temperatures VET (ISO 306) in one preferred embodiment are disposed in the range from at least 90° C., preferably from 100° C., to 115° C.

The proportion of the thermoplastic polymer in the solid content of the coating agent amounts to at least 30% by weight, by particular preference at least 40% by weight and by quite particular preference 45% by weight.

The term of the at least one photo-initiator of the coating agent according to the invention covers the current, commercially available compounds familiar to the person skilled in the art, such as: α-hydroxyketones, benzophenone, α,α-diethoxyacetophenone, 4,4-diethylaminobenzophenone, 2,2-dimethoxy-2-phenylacetophenone, 4-isopropylphenyl-2-hydroxy-2-propylketone, 1-hydroxycyclohexylphenylketone, isoamyl-p-dimethylaminobenzoate, methyl-4-dimethylaminobenzoate, methyl-o-benzoylbenzoate, benzoin, benzoin ethylether, benzoin isopropyl ether, benzoin isobutyl ether, 2-hydroxy-2-methyl-1-phenylpropan-1-one, 2-isopropyl thioxanthone, dibenzosuberone, 2,4,6-trimethylbenzoyl diphenylphosphine oxide, bisacylphosphinoxide and others, wherein the named photo-initiators can be used alone or in combination of two or more or in combination with one of the above polymerisation initiators.

As UV-photo-initiators, the following are used, by way of example: IRGACURE®-types from BASF, therefore, for example, the types IRGACURE® 184, IRGACURE® 500, IRGACURE® 1173, IRGACURE®2959, IRGACURE® 745, IRGACURE® 651, IRGACURE® 369, IRGACURE®

907, IRGACURE® 1000, IRGACURE® 1300, IRGACURE® 819, IRGACURE® 819DW, IRGACURE® 2022, IRGACURE® 2100, IRGACURE® 784, IRGACURE® 250, furthermore the DAROCUR®-types from BASF are used, therefore, for example, the types DAROCUR® MBF, DAROCUR® 1173, DAROCUR® TPO, DAROCUR® 4265. Inter alia, the other UV-photo-initiators are used e.g. Esacure One (manufactured by Lamberti).

Photo-initiators within the range from ≥0.1 to ≤10 proportion by weight of the solid content of the coating agent are contained in the coating agent.

Furthermore, beyond the 100 parts by weight of the components 1) to 3), the coating agent contains one or more organic solvent. Such organic solvents can be selected, for example, from the group containing aromatic solvents, such as xylene or toluene, ketones, such as, acetone, 2-butanone, methyl-isobutylketone, diacetone alcohol, alcohols, such as methanol, ethanol, i-propanol, butanol, 1-methoxy-2-propanol, ethers, such as 1,4-dioxane, ethylene glycol-n-propyl-ether, or esters, ethyl acetate, butyl acetate, 1-methoxy-2-propyl acetate or mixtures containing these solvents.

Ethanol, i-propanol, butanol, ethyl acetate, butyl acetate, 1-methoxy-2-propanol, diacetone alcohol, xylene or toluene are preferred. Particularly preferred are i-propanol, butanol, ethyl acetate, butyl acetate, 1-methoxy-2-propanol, diacetone alcohol and mixtures thereof. 1-Methoxy-2-propanol and diacetone alcohol are quite particularly preferred, I-methoxy-2-propanol is especially preferred.

In addition to the 100 parts by weight of the components a) to c), the lacquer composition preferably contains, 0 to 900 parts by weight, by particular preference 100 to 850 parts by weight, by quite particular preference 200 to 800 parts by weight of at least one organic solvent (component d)).

Furthermore, beyond the 100 parts by weight of the components a) to c), the coating agent can optionally contain one or more further lacquer additives. Such lacquer additives can be selected, for example, from the group containing stabilisers, levelling agents, surface additives, pigments, colorants, inorganic nanoparticles, adhesion promoters, UV absorbers, IR absorbers, preferably from the group containing stabilisers, levelling agents, surface additives and inorganic nanoparticles. In addition to the 100 parts by weight of the components a) to c), the lacquer composition preferably contains 0 to 35 parts by weight, by particular preference 0 to 30 parts by weight, by quite particular preference 0.1 to 20 parts by weight of at least one lacquer additive. By preference, the total content of all lacquer additives contained in the lacquer composition amounts to 0 to 20 parts by weight, by particular preference, 0 to 10 parts by weight, by quite particular preference 0.1 to 10 parts by weight.

The composition of the coating agent can contain inorganic nanoparticles to increase the mechanical resistance, for example, scratch resistance and/or pencil hardness.

Inorganic oxides, oxide mixtures, hydroxides, sulphates, carbonates, carbides, borides and nitrides of elements of main groups II to IV and/or elements of subgroup I to VIII of the periodic system including the lanthanides come into consideration as nanoparticles. Preferred nanoparticles are silicon oxide, aluminium oxide, cerium oxide, zirconium oxide, niobium oxide, zinc oxide or titanium oxide nanoparticles, silicon oxide nanoparticles are particularly preferred.

The particles used preferably comprise mean particle sizes (measured by means of dynamic light scattering in dispersion determined as Z mean value) smaller than 200 nm, preferably from 5 to 100 nm, by particular preference 5 up to 50 nm. By preference, at least 75%, by particular preference at least 90%, by quite particular preference at least 95% of all of the nanoparticles used comprise the sizes defined above.

The coating agent can be manufactured in a simple manner, in that the polymer is initially completely dissolved in the solvent at room temperature or at increased temperatures, and then, the other obligatory and, if required, the optional components, are either, in the absence of solvent(s), added together to the solution cooled to room temperature and mixed with one another by stirring or, in presence of solvent(s), for example, added to the solvent or solvents and mixed with one another by stirring. By preference, the photo-initiator is first dissolved in the solvent or solvents and then the other components are added. A cleaning by means of filtration, preferably by means of fine filtration, is then optionally implemented.

A further subject matter of the present invention is a coated film, comprising a synthetic-material film and a coating which is obtainable by coating of at least one side of the synthetic-material film with a coating agent according to the present invention.

Such a film accordingly comprises a coating which comprises the advantages of the present invention, such as a combination of block resistance, scratch and solvent resistance, and a given thermal formability in a 2-D-FIM process. Accordingly, the films of the present invention are suitable in a special manner for use in 2-D-FIM processes, especially for the manufacture of corresponding molded parts with scratch resistant and solvent resistant surface. In a special manner, these advantages come to light when the coating has been dried directly after coating and hardened with UV radiation. Accordingly, a film of which the coating has been dried directly after the application and hardened by means of UV radiation is preferred according to the present invention.

Transparent thermoplastics such as polycarbonate, polyacrylate or poly(meth)acrylate, polysulfones, polyesters, thermoplastic polyurethane and polystyrene, and their copolymers and mixtures (blends) are preferably used as films to be coated. Appropriate thermoplastics are, for example, polyacrylates, poly(meth)acrylates (e.g. PMMA; e.g. Plexiglas® manufactured by Röhm), cycloolefin-copolymers (COC; e.g. Topas® manufactured by Ticona; Zenoex® manufactured by Nippon Zeon or Apel® manufactured by Japan Synthetic Rubber), polysulfones (Ultrason® manufactured by BASF or Udel® manufactured by Solvay), polyesters, such as PET or PEN, polycarbonate (PC), polycarbonate/polyester-blends, e.g. PC/PET, polycarbonate/polycyclohexyl methanol cyclohexane dicarboxylate (PCCD; Xylecs® manufactured by GE), polycarbonate/PBT and mixtures thereof.

In one particularly advantageous and preferred embodiment, the film of the molded body according to the invention comprises polycarbonate or copolycarbonate.

The coating on the films according to the invention is present in one preferred embodiment with a layer thickness in the range from ≥0.1 µm to ≤50 µm, preferably in the range from ≥1 µm to ≤40 µm and by particular preference in the range from ≥3 µm to ≤30 µm. Within these ranges, the property combination of the coating according to the invention comes to bear in a particularly advantageous manner.

Because of the excellent impact toughness with simultaneous transparency, polycarbonate is also used within the scope of the present invention as a thermoplastic polymer for back injection of the film 2-D molded and coated with the protective layer. In a similarly particularly preferred embodiment of the present invention, the thermoplastic polymer accordingly comprises polycarbonate. Polycarbonates, polycarbonate-preparations and polycarbonate-films suitable for the invention are available, for example, under the trade names Makrolon®, Bayblend® and Makroblend® (Bayer MaterialScience AG, Leverkusen, Germany).

Suitable polycarbonates for the manufacture of the polycarbonate compositions according to the invention are all known polycarbonates. These are homopolycarbonates, copolycarbonates and thermoplastic polyester carbonates. The appropriate polycarbonates preferably have mean molecular weights $\overline{M}_w$ from 18,000 to 40,000, preferably from 26,000 to 36,000 and especially from 28,000 to 35,000, determined by measurement of the relative solution viscosity in dichloromethane or in mixtures of the same volumes by weight of phenol/o-dichlorobenzene calibrated by light scattering.

The manufacture of the polycarbonates is preferably implemented according to the phase-interface process or the melt re-esterification process, which have been described extensively in the literature. With regard to the phase interface process, reference is made by way of example to H. Schnell, Chemistry and Physics of Polycarbonates, Polymer Reviews, Vol. 9, Interscience Publishers, New York 1964 pages 33 ff., to Polymer Reviews, Vol. 10, "Condensation Polymers by Interfacial and Solution Methods", Paul W. Morgan, Interscience Publishers, New York 1965, Chapter VIII, page 325, to Dres. U. Grigo, K. Kircher and P. R-Müller "Polycarbonate" in Becker/Braun, Kunststoff-Handbuch, Vol. 3/1, Polycarbonate, Polyacetale, Polyester, Celluloscester, Carl Hanser Verlag München, Vienna 1992, pages 118-145 and to EP-A 0 517 044. The melt re-esterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and in the patent specifications DE-B 10 31 512 and US-B 6 228 973.

The polycarbonates can be obtained from reactions of bisphenol compounds with carbonic acid compounds, especially phosgene or, in the case of the melt re-esterification process diphenyl carbonate or respectively dimethyl carbonate. Here, homopolycarbonates based on bisphenol-A and copolycarbonates based on the monomers bisphenol-A and 1,1-bis-(4-hydroxyphenyl)-3,3,5-trimethylcyclohexane are particularly preferred. Other bisphenol compounds which can be used for the polycarbonate synthesis are disclosed, inter alia, in WO-A 2008037364, EP-A 1 582 549, WO-A 2002026862, WO-A 2005113639.

The polycarbonates can be linear or branched. Mixtures of branched and unbranched polycarbonates can be used.

Suitable branching agents for polycarbonates are known from the literature and described, for example, in the patent specifications U.S. Pat. No. 4,185,009, DE-A 25 00 092, DE-A 42 40 313, DE-A 19 943 642, U.S. Pat. No. 5,367,044 and in the literature cited herein. Furthermore, the polycarbonates used can also be branched intrinsically, wherein no branching agent is added here within the context of the polycarbonate manufacture. One example for intrinsic branchings are the so-called Fries structures, as they are disclosed for melt polycarbonates in EP-A 1 506 249.

Furthermore, chain breaker can be used in the polycarbonate manufacture. Phenols such as phenol, alkylphenols such as kresol and 4-tert.-butylphenol, chlorophenol, bromphenol, cumylphenol or mixtures thereof are preferably used as chain breakers.

The synthetic-material composition(s) of the film and respectively of the thermoplastic polymer of the 3-D molded body can additionally contain additives, such as UV absorbers, IR absorbers and other conventional processing additives, especially mold release agents and flow agents, and the conventional stabilisers, especially thermo-stabilisers and antistatic agents, pigments, colorants and optical brighteners. Here, different additives or respectively different concentrations of additives can be present in each layer.

By preference, the molded bodies of the present invention can be obtained through a 2-D film-insert molding process. A further subject matter of the present invention is therefore a method for the manufacture of a molded part, comprising the steps:

(I) Coating one surface of a film with a coating agent, comprising
  (a) at least one thermoplastic polymer with a content of at least 30% by weight of the solid content of the coating agent;
  (b) at least one UV hardenable reactive thinner with a proportion of at least 30% by weight of the solid content of the coating agent;
  (c) at least one photo-initiator, and
  (d) at least one organic solvent,
  wherein the proportion of ethylenically unsaturated groups amounts to at least 3 mol per kg of the solid content of the coating agent,
  wherein the at least one reactive thinner comprises at least three polymerisable (meth)acrylate functions in the molecule and
  wherein the ester-oxygen atoms of the (meth)acrylate functions in the molecule of the reactive thinner are separated from one another by a chain of at least six atoms;
(II) Drying of the coating;
(III) Hardening of the coating through actinic radiation, preferably UV radiation;
(IV) Thermal and/or mechanical deformation of the film;
(V) Back coating of the uncoated surface of the film with a thermoplastic polymer,
wherein the steps (IV) and (V) can be implemented successively or preferably simultaneously.

In general, the coating agent involved here is the coating agent according to the present invention. For the film also, what was described above for the film according to the invention applies, especially for the composition and the layer thickness of the coating obtained on the film.

The coating of the film with the coating agent can be implemented here according to the conventional methods of coating films with liquid coating agents, for example, by blade coating, injection, casting, flow coating, immersion, spraying, roller coating or centrifugal coating. The flow coating process can be implemented manually with a hose or appropriate coating head or automatically in continuous operation through flow-coating lacquer robot and optionally slotted nozzles. An application of the coating agent via a roller-to-roller transfer is preferred. The surface of the film to be coated here can be pre-treated by cleaning or activation.

The application of the coating agent to the film is followed by the drying. Increased temperatures in furnaces and with moving and optionally also dehumidified air, for example, in convection furnaces or by means of nozzle dryers and heat radiation, such as IR and/or NIR are especially used for this purpose. Furthermore, microwaves can be used. It is possible and advantageous to combine several of these drying processes. The drying of the coating in step (II) preferably comprises an air extraction at room temperature and/or increased temperature, such as, preferably at 20-200° C., by particular preference at 40-120° C. After the drying of the coating, the latter is block resistant, so that the coated substrate, especially the coated film, can be laminated and/or printed.

The conditions for the drying are advantageously selected in such a manner that, through the increased temperature and/or the heat radiation, no polymerisation (cross-linking) of the acrylate or methacrylate groups is triggered, because this can impair deformability. Furthermore, the maximum temperature reached should expediently be selected so low that the film is not deformed in an uncontrolled manner.

After the drying/hardening step, the coated film can be rolled up, optionally after lamination with a protective film on the coating. The rolling up can be implemented without the occurrence of adhesion of the coating to the rear side of the substrate film or the lamination film. However, it is also possible to cut the coated film to size and to supply the cut pieces individually or as a stack for further processing.

Hardening is understood in particular as hardening with actinic radiation. This is understood to mean the radical polarisation of ethylenically unsaturated carbon-carbon double bonds by means of initiator radicals, which are released through irradiation with actinic radiation, for example, from the photo-initiators described above.

The radiation hardening is preferably implemented through the action of energy-rich radiation, that is, UV radiation or daylight, for example, light of the wavelength ≥200 nm to ≤750 nm, or through irradiation with energy-rich electrons (electron radiation, for example, ≥90 keV to ≤300 keV). As radiation sources for light or UV light, for example, medium or high-pressure mercury vapour lamps are used, wherein the mercury vapour can be modified by doping with other elements such as gallium or iron. Laser, pulsed lamps (known by the designation UV flash spotlight), halogen lamps or excimer spotlights can be used. The spotlights can be installed in a fixed location, so that the product to be irradiated is moved past by means of a mechanical device on the radiation source, or the spotlights can be movable, and the product to be irradiated does not change its location. The conventional radiation dose adequate for cross-linking in the case of UV hardening is disposed within the range from ≥80 mJ/cm$^2$ to ≤5000 mJ/cm$^2$.

In one preferred embodiment, the actinic radiation is therefore light in the range of UV light.

The irradiation can optionally also be implemented with the exclusion of oxygen, for example, under inert gas atmosphere or oxygen-reduced atmosphere. As inert gases, nitrogen, carbon dioxide, noble gases or combustion gases are suitable by preference. Furthermore, the irradiation can be implemented by covering the coating with media transparent for the radiation. Examples of this are synthetic-material films, glass or liquids such as water.

Dependent upon radiation dose and hardening conditions, the type and concentration of the optionally used initiator should be varied or respectively optimised in the manner known to the person skilled in the art or through preliminary orientation experiments. For the hardening of the films, it is particularly advantageous to implement the hardening with several spotlights, the arrangement of which should be selected in such a manner that every point of the coating, as far as possible, receives the dose and intensity of radiation optimal for the hardening. In particular, non-irradiated regions (shadow zones) should be avoided.

Furthermore, it may be advantageous, dependent upon the film used, to select the irradiation conditions so that the thermal stress of the film does not become too large. In particular, thin films and films made from materials with low glass transition temperature can tend towards uncontrolled deformation, if a given temperature is exceeded through the irradiation. In these cases, it is advantageous to allow as little infrared radiation as possible to act on the substrate through appropriate filters or the design of the spotlights. Furthermore, the uncontrolled deformation can be counteracted by reducing the corresponding radiation dose. However, it should be noted here that a given dose and intensity of radiation are necessary for the most complete polymerisation possible. In these cases, it is particularly advantageous to harden under inert or oxygen-reduced conditions, since, with a reduction of the oxygen content in the atmosphere above the coating, the dose required for hardening is reduced.

By particular preference, mercury spotlights are used in fixed-location plants for the hardening. Photo-initiators are then used in concentrations of ≥0.1% by weight to ≤10% by weight, by particular preference ≥0.2% by weight to ≤3.0% by weight with reference to the solid body of the coating. For the hardening of these coatings, a dose of ≥80 mJ/cm$^2$ to ≤5000 mJ/cm$^2$ is preferably used.

The back injection of the coated film after the completed hardening of the film coating and the re-formation of the coated film is well known to the person skilled in the art through the film-insert molding process, as it is described, for example, in WO 2004/082926 A1 and WO 02/07947 A1. In one preferred embodiment of the method according to the invention, the back coating of the film is implemented in step (V) by means of extrusion or injection molding, preferably with polycarbonate melt. The processes of extrusion and injection molding for this purpose are well known to the person skilled in the art and described, for example, in the "Handbuch Spritzgießen", Friedrich Johannnaber/Walter Michaeli, Munich; Vienna: Hanser, 2001, ISBN 3-446-15632-1 or "Anleitung zum Bau von Spritzgießwerkzeugen", Menges/Michaeli/Mohren, Munich; Vienna: Hanser, 1999, ISBN 3-446-21258-2.

In one preferred embodiment, the sequence of steps is varied. In this preferred embodiment, the deformation of the film in step (IV) is implemented simultaneously with step (V), that is, the back injection with a thermoplastic polymer, especially polycarbonate. In this embodiment, the coated film, on which the coating is present already dried and hardened, is then optionally cut to size, printed and introduced into an injection molding mold. After the closing of the mold, the film is then back injected with the thermoplastic polymer. In this manner, in a particularly efficient manner, a molded body is obtained, of which the surface comprises the advantages of the coating according to the invention.

A further subject matter of the present invention is therefore also a molded body, comprising a coated film according to the present invention, preferably comprising polycarbonate and obtainable through a 2-D film-insert molding process.

Because of the particularly advantageous property combination of the coating obtainable with the coating agent according to the invention, the coating agent according to the invention and the film according to the invention are especially suitable for the manufacture of molded bodies in the 2-D film-insert molding process. A further subject matter of the present invention is therefore the use of the coating agent according to the invention or of the coated film according to the invention for the manufacture of molded bodies in 2-D film-insert molding process.

EXAMPLES

Evaluation Methods

The layer thickness of the coatings was measured by observation of the cut edge in an optical microscope of the type Axioplan manufactured by Zeiss. Method—incident light, bright field, enlargement 500×.

Evaluation of Pencil Hardness

The pencil hardness was measured by analogy with ASTM D 3363 using an Elcometer 3086 Scratch boy (Elcometer Instruments GmbH, Aalen, Germany) with a load of 500 g, unless otherwise indicated.

Evaluation of the Steel Wool Scratching

The steel wool scratching is determined by glueing a steel wool No. 00 (Oskar Well GmbH Rakso, Lahr, Germany) onto the flat end of a 500 g hammer, wherein the area of the hammer is 2.5 cm×2.5 cm, that is, approximately 6.25 cm2. The hammer is placed without additional pressure onto the area to be tested, so that a defined load of approximately 560 g is reached. The hammer is then moved back and forth 10 times in double strokes. Following this, fabric residues and lacquer particles are cleaned from the loaded surface with a soft cloth. The scratching is characterised by haze and gloss values, measured transversely to the scratching direction with a Micro-HAZE plus (20°-Gloss and Haze; Byk-Gardner GmbH, Geretsried, Germany). The measurement is implemented before and after scratching. The difference values for gloss and haze before and after loading are indicated as Δgloss and Δhaze.

Evaluation of Solvent Resistance

The solvent resistance of the coatings was measured conventionally with isopropanol, xylene, 1-methoxy-2-propylacetate, ethylacetate, acetone of technical quality. The solvents were applied to the coating with an impregnated cotton wool swab and protected from evaporation by covering. Unless otherwise described, an acting time of 60 minutes at approximately 23° C. was observed. After the end of the acting time, the cotton wool swab is removed and the test area is wiped clean with a soft cloth. The examination is carried out visually immediately and after light scratching with a fingernail.

The following stages are distinguished:
0=unchanged; no change visible; not damaged by scratching.
1=slight swelling visible, but not damaged by scratching.
2=change clearly visible, hardly damaged by scratching.
3=noticeably changed; surface destroyed after firm fingernail pressure.
4=strongly changed after firm fingernail pressure scratched through to substrate.
5=destroyed; the lacquer is already destroyed when wiping away the chemicals; the test substance is not removable (pitted).

Within this evaluation, the test is conventionally passed with the values 0 and 1. Values >1 stand for "not passed".

Example 1

175 g Degacryl M547 (Evonik) were completely dissolved in 994 g 1-methoxy-2-propanol at 100° C. within approximately 3 h. The solution was cooled to approximately 30° C. Separately, the following components were dissolved in 581 g 1-methoxy-2-propanol at room temperature: 252 g ethoxylated (4) pentaerythrite-tetraacrylate (SR 494, Sartomer), 10.1 g Esacure One (Lamberti), 5.04 g Darocur 4265 (BASF), 0.9 g BYK 333 (BYK). The second solution was added to the polymer solution while stirring. The coating agent obtained in this manner was stirred for a further 3 h at room temperature and, with a screening of the influence of direct light, bottled and allowed to rest for 1 day. The yield was 2000 g, the viscosity (23° C.) 1380 mPas and the solid content 22% by weight. The calculated double bond density in the solid content of the coating agent was approximately 4.5 mol/kg.

Example 2

200 g Degacryl M547 (Evonik) were completely dissolved in 1136 g 1-methoxy-2-propanol at 100° C. within approximately 3 h. The solution was cooled to approximately 30° C. Separately, the following components were dissolved in 664 g 1-methoxy-2-propanol at room temperature: 200 g ethoxylated (4) pentaerythrite-tetraacrylate (SR 494, Sartomer), 8 g Esacure One (Lamberti), 4 g Darocur 4265 (BASF), 1 g BYK 333 (BYK). The second solution was added to the polymer solution while stirring. The coating agent obtained in this manner was stirred for a further 3 h at room temperature and, with a screening of the influence of direct light, bottled and allowed to rest for 1 day. The yield was 2200 g, the viscosity (23° C.) 1800 mPas and the solid content 19% by weight. The calculated double bond density in the solid content of the coating agent was approximately 3.8 mol/kg.

Comparison Example 1

275 g Degacryl M547 (Evonik) were completely dissolved in 1562 g 1-methoxy-2-propanol at 100° C. within approximately 3 h. The solution was cooled to approximately 30° C. Separately, the following components were dissolved in 913 g 1-methoxy-2-propanol at room temperature: 275 g dipentaerythrite-penta/hexaacrylate (DPHA, Cytec), 11 g Esacure One (Lamberti), 5.5 g Darocur 4265 (BASF), 1.4 g BYK 333 (BYK). The second solution was added to the polymer solution while stirring. The coating agent obtained in this manner was stirred for a further 3 h at room temperature and, with a screening of the influence of direct light, bottled and allowed to rest for 1 day. The yield was 3000 g, the viscosity (23° C.) 2453 mPas and the solid content 19% by weight. The calculated double bond density in the solid content of the coating agent was approximately 5.1 mol/kg.

Example 3

The coating agents corresponding to Examples 1 and 2 and Comparison Example 1 were applied by means of slot caster to a carrier film, for example Makrofol DE 1-1 (Bayer MaterialScience AG, Leverkusen, Germany).

Typical application conditions whereas follows:
Track velocity 1.3 to 2.0 m/min.
Wet lacquer application 20-150 μm
Ambient air dryer 90-110° C., preferably within the range of the $T_g$ of the polymer to be dried.
Dwell time in the dryer 3.5-5 min.

The coating was implemented roller-to-roller, that is, the polycarbonate film was unrolled in the coating plant. The film was guided through one of the above named application appliances and charged with the coating solution. After that, the film with the wet coating was passed through the dryer. After leaving the dryer, the now dried coating was transferred continuously into a UV hardening plant and then provided with a lamination film in order to protect the latter from contamination and scratching. Following this, the film was rolled up again.

Example 4

The chemical and scratch resistance of the coated sides of the coated films from Example 3 were tested as indicated above. The results are summarised in Table 1.

TABLE 1

Chemical and scratch resistance of the coatings

| Coating agent/<br>Layer thickness on<br>250 μm PC-film | Solvent<br>IP/MPA/X/<br>EA/Ac<br>1 h/RT | Pencil<br>hardness<br>500 g<br>Mitsubishi | Steel wool<br>(Manufactured by<br>Rakso, No. 00)<br>560 g/10 DH<br>ΔG/ΔH |
|---|---|---|---|
| Example 1/6 μm | 0/0/0/0/1 | B | 2/3 |
| Example 1/11 μm | 0/0/0/0/1 | HB | 1/2 |
| Example 1/16 μm | 0/0/0/0/1 | HB | 3/3 |
| Example 1/22 μm | 0/0/0/0/0 | F | 3/4 |
| Example 1/25 μm | 0/0/0/0/1 | H | 2/3 |
| Example 2/5 μm | 0/0/0/1/5 | B | 0/1 |
| Example 2/8 μm | 0/0/0/0/5 | HB | 3/6 |
| Example 2/13 μm | 0/0/0/0/5 | HB | 0/4 |
| Example 2/17 μm | 0/0/0/0/0 | F | 2/1 |
| Example 2/23 μm | 0/0/0/0/0 | H | 2/4 |
| Comparison Example 1/6 μm | 0/0/0/0/1 | B | 3/4 |
| Comparison Example 1/9 μm | 0/0/0/0/0 | B | 1/4 |
| Comparison Example 1/12 μm | 0/0/0/0/0 | HB | 5/9 |
| Comparison Example 1/16 μm | 0/0/0/0/0 | HB | 9/16 |
| Comparison Example 1/23 μm | 0/0/0/0/0 | F | 3/8 |
| Makrofol DE 1-1 250 μm, uncoated | 0/5/5/5/5 | 3B | 100/285 |

IP/MPA/X/EA/Ac stands for isopropanol, 1-methoxy-2-propylacetate, xylene, ethylacetate, acetone RT stands for room temperature, here approximately 23° C.

As shown in Table 1, even in a thin layer, the coating according to the invention improves the pencil hardness and scratch resistance of the film significantly by comparison with the known properties of the polycarbonate. The coating according to the invention also provides a high solvent resistance.

Example 5

The film coated according to the invention can be deformed with the process described above according to the current prior art.

In the film-insert molding process, the film according to the invention is optionally printed on the rear side, punched into the desired shape or cut to size and placed into the injection molding mold. The injection molding experiments were carried out with an injection molding machine of the type Arburg TYP: 570C 2000/-675(350). After closing of the mold, the film was back injected with Makrolon 2405 (Bayer) with a mass temperature of 280° C. The filling time for the filling of the tool was 2 seconds. The tool temperature was varied. Good results were achieved with a tool temperature in the range from 80° C. and 100° C. In this respect, no negative effect was observed visually. The holding-pressure time was 12 seconds and the cooling time was disposed around 20 seconds.

It was noted here, that the easy deformation of film and lacquer here took place rapidly and without special heating. Many commercially available hardcoats do not withstand this deformation without forming cracks.

With the method, the heating-ventilation screens (HV screens) were manufactured from the films of Example 3 (coating agent from Examples 1 and 2 and of the Experiment Example 1). The surfaces, especially the critical radii, were evaluated optically after manufacture of the HV screens, by means of a microscope from ZEISS, type: Axioplan (enlargement 6×). The samples without visible cracks on the entire surface were evaluated positively.

The results are summarised in Table 2:

TABLE 2

Evaluation of the front surface of the synthetic-material parts manufactured in the film-insert molding process

| Coating agent/<br>Layer thickness on<br>250 μm PC-film | Observation in optical<br>stereo-microscope<br>(Enlargement 6x) |
|---|---|
| Example 1 - 6 μm | Crack-free surface |
| Example 1 - 11 μm | Crack-free surface |
| Example 1 - 16 μm | Crack-free surface |
| Example 2 - 5 μm | Crack-free surface |
| Example 2 - 8 μm | Crack-free surface |
| Example 2 - 13 μm | Crack-free surface |
| Example 2 - 17 μm | Crack-free surface |
| Comparison Example 1 - 6 μm | Crack-free surface |
| Comparison Example 1 - 9 μm | Isolated cracks |
| Comparison Example 1 - 12 μm | Isolated cracks |
| Comparison Example 1 - 16 μm | Isolated cracks |

The examples have shown that the films according to the invention with the coatings from the Examples 1 and 2 withstand the 2-D forming in the back-injection process without problems, without the hardcoat layer experiencing damage here. In this case, the coating agent according to the invention contains ethoxylated (4) pentaerythrite-tetraacrylate (SR 494, Sartomer) as reactive thinner. The shortest connecting chain between two acrylate groups in molecule of this reactive thinner contained, according to the invention, 9 atoms.

By contrast, films with the coatings from the Comparison Example 1 receive isolated cracks in the region of the strongest deformation after the 2-D forming in the back-injection process. In this case, the coating agent contains dipentaerythrite-penta/hexaacrylate (DPHA, Cytec) as reactive thinner. The shortest connecting chain between two acrylate groups in molecule of this reactive thinner contains only 3 atoms.

The invention claimed is:

1. A coating agent comprising
    (a) at least one thermoplastic polymer with a proportion of at least 30% by weight of the solid content of the coating agent;
    (b) at least one UV hardenable reactive thinner with a proportion of at least 30% by weight of the solid content of the coating agent;
    (c) at least one photo-initiator; and
    (d) at least one organic solvent,
    wherein the proportion of ethylenically unsaturated groups amounts to at least 3 mol per kg of the solid content of the coating agent, wherein the at least one reactive thinner comprises at least three polymerisable (meth)acrylate functions in the molecule and wherein the ester-oxygen atoms of the (meth)acrylate functions in the molecule of the reactive thinner are separated from one another by a chain of at least six atoms.

2. The coating agent according to claim 1, wherein the proportion of ethylenically unsaturated groups amounts to at least 3.5 mol per kg of the solid content of the coating agent.

3. The coating agent according to claim 1, wherein the atoms of the chain separating the ester-oxygen atoms of the acrylate functions in the molecule of the reactive thinner are selected from C, N, O, S and P atoms and combinations thereof.

4. The coating agent according to claim 1, wherein the ester-oxygen atoms of the acrylate functions in the molecule of the reactive thinner are separated from one another by a chain of at least nine atoms.

5. The coating agent according to claim 1, wherein the at least one reactive thinner is selected from the group consisting of triacrylates of ethoxylated trimethylol propane, and tetraacrylates of ethoxylated pentaerythrite.

6. The coating agent according to claim 5, wherein the reactive thinner is ethoxylated (4) pentaerythrite-tetraacrylate and/or ethoxylated (9) trimethylol propane-triacrylate.

7. The coating agent according to claim 1, wherein the thermoplastic polymer comprises PMMA homopolymers and/or copolymers made of 70% by weight to 99.5% by weight methylmethacrylate and 0.5% by weight to 30% by weight methylacrylate.

8. The coating agent according to claim 1, wherein the solvent is 1-methoxy-2-propanol.

9. A coated film comprising a synthetic-material film and a coating, obtained by coating at least one side of the synthetic-material film with a coating agent according to claim 1.

10. The coated film according to claim 9, wherein the coating is dried and hardened directly after the coating.

11. The coated film according to claim 9, wherein the synthetic material of the synthetic-material film is selected from the group consisting of polycarbonate, copolycarbonate, polyester, polyethylene terephthalate, polypropylene, polystyrene, and polyvinylchloride.

12. The coated film according to claim 9, wherein the coating is present with a layer thickness in the range from $\geq 0.1$ µm to $\leq 50$ µm.

13. A method for manufacturing a molded part, comprising the steps (I) coating of a surface of a film with a coating agent according to claim 1;

(II) drying of the coating;

(III) hardening of the coating through actinic radiation, preferably UV radiation;

(IV) thermally and/or mechanically deforming the film;

(V) back coating of the uncoated surface of the film with at least one thermoplastic polymer, wherein the steps (IV) and (V) can be implemented successively or simultaneously.

14. The method according to claim 13, wherein the steps (IV) and (V) take place simultaneously.

15. A molded body comprising at least one coated film according to claim 9.

* * * * *